(12) United States Patent
Fiori et al.

(10) Patent No.: US 10,457,564 B2
(45) Date of Patent: Oct. 29, 2019

(54) AMMONIA PRODUCTION PLANT

(71) Applicant: NUOVO PIGNONE TECNOLOGIE SRL, Florence (IT)

(72) Inventors: Marco Fiori, Florence (IT); Sergio Ghezzi, Florence (IT); Antonio Pelagotti, Florence (IT)

(73) Assignee: Nuovo Pignone Tecnologie SRL (IT)

( * ) Notice: Subject to any disclaimer, the term of this patent is extended or adjusted under 35 U.S.C. 154(b) by 0 days.

(21) Appl. No.: 16/240,530

(22) Filed: Jan. 4, 2019

(65) Prior Publication Data
US 2019/0210885 A1 Jul. 11, 2019

(30) Foreign Application Priority Data

Jan. 8, 2018 (IT) ........................ 102018000000620

(51) Int. Cl.
| | | |
|---|---|---|
| C01C 1/04 | (2006.01) | |
| C01C 1/02 | (2006.01) | |
| C01B 3/02 | (2006.01) | |
| F25J 3/00 | (2006.01) | |
| F25J 3/02 | (2006.01) | |

(52) U.S. Cl.
CPC ............ *C01C 1/0417* (2013.01); *C01B 3/025* (2013.01); *C01C 1/0458* (2013.01); *F25J 3/0276* (2013.01); *C01B 2203/068* (2013.01); *F25J 2210/60* (2013.01); *F25J 2215/20* (2013.01)

(58) Field of Classification Search
CPC .. C01B 3/00; C01B 3/02; C01B 3/025; C01B 2203/06; C01B 2203/068; C01C 1/00; C01C 1/02; C01C 1/04; C01C 1/0405; C01C 1/0417; C01C 1/0458; F25J 3/00; F25J 3/02; F25J 3/0228; F25J 3/0276; F25J 2210/60; F25J 2215/20

See application file for complete search history.

(56) References Cited

U.S. PATENT DOCUMENTS

| | | | |
|---|---|---|---|
| 3,549,335 A | 12/1970 | Grotz | |
| 4,172,885 A * | 10/1979 | Perry | ............... C01C 1/0476 423/359 |
| 5,011,625 A * | 4/1991 | Le Blanc | ............... B01J 8/025 252/373 |
| 2014/0311183 A1 * | 10/2014 | Van Aken | ............... F04D 27/002 62/611 |
| 2017/0350627 A1 | 12/2017 | Arora | |
| 2017/0356451 A1 | 12/2017 | Bresciani et al. | |

FOREIGN PATENT DOCUMENTS

| | | |
|---|---|---|
| JP | 2000154020 A | 6/2000 |
| WO | 2016131623 A1 | 8/2016 |

OTHER PUBLICATIONS

IT Search Report and Written Opinion issued in connection with corresponding Application No. IT 102018000000620 dated Jun. 11, 2018.

* cited by examiner

*Primary Examiner* — Natasha E Young
(74) *Attorney, Agent, or Firm* — Baker Hughes Patent Organization

(57) ABSTRACT

The ammonia production plant includes a feed gas compression section, a process air compression section, a syngas compression section and a refrigerant compression section. At least two of these compression sections are combined together forming a combined compression train driven by a single driver.

16 Claims, 7 Drawing Sheets

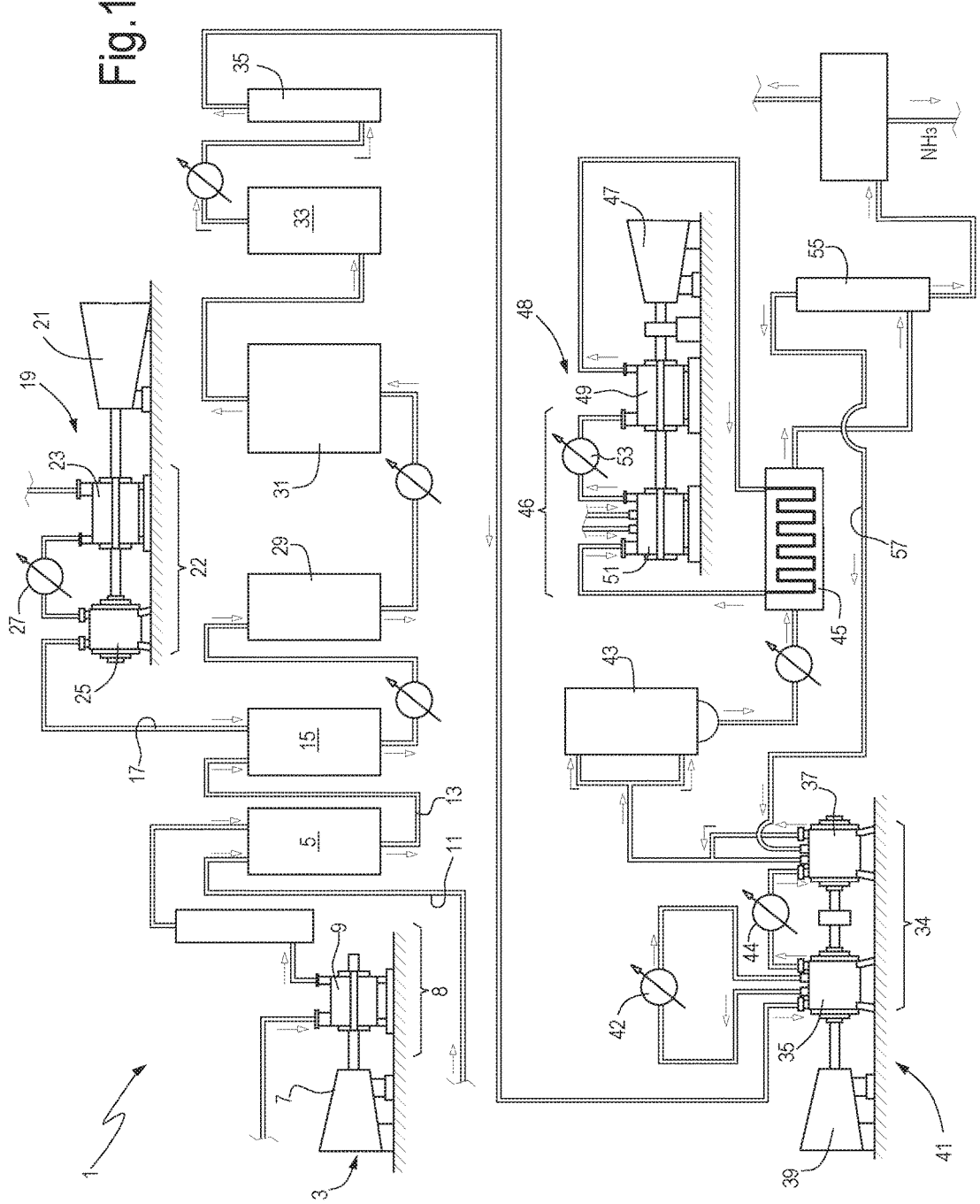

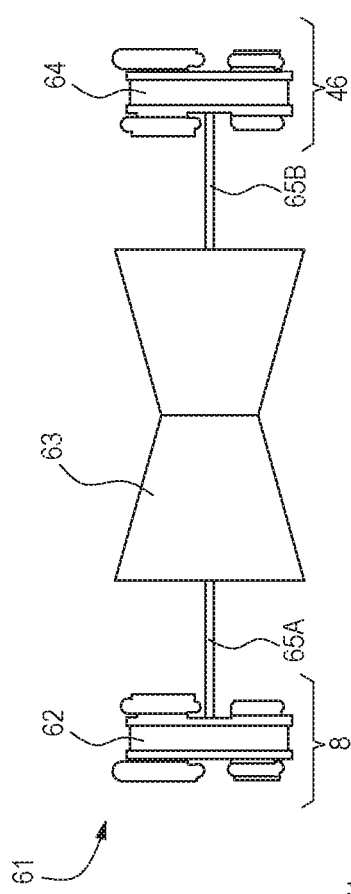
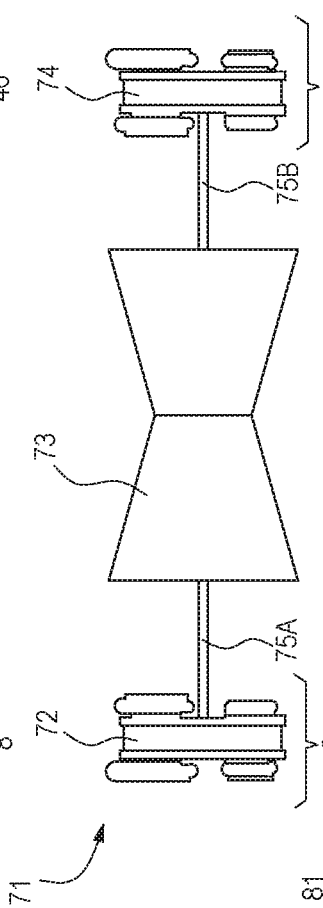
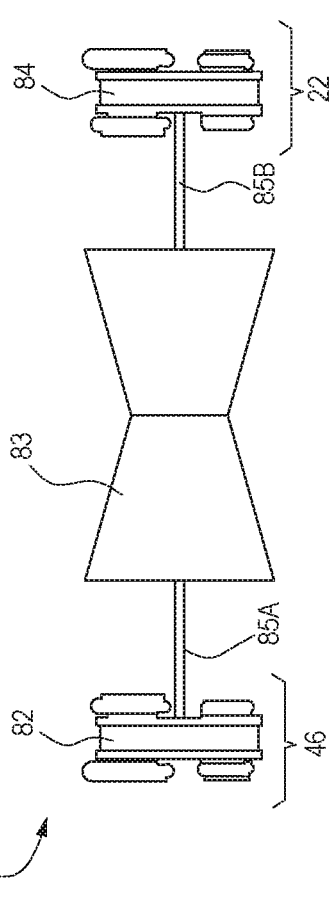

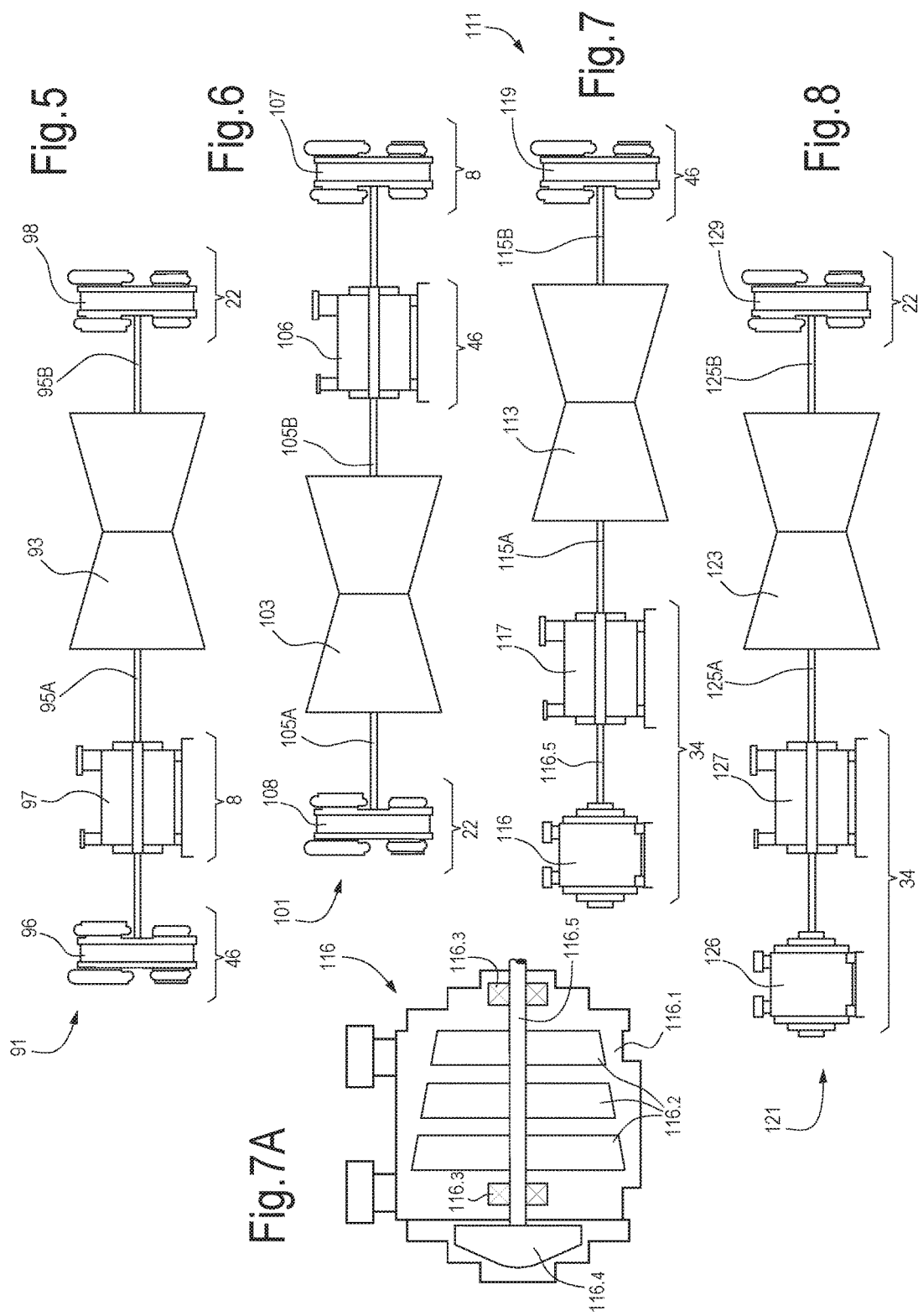

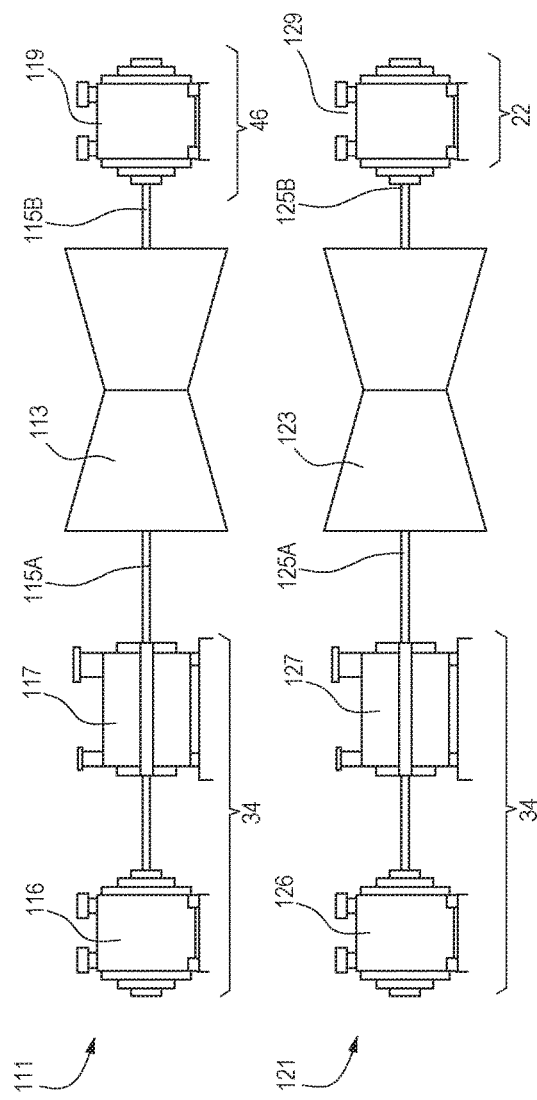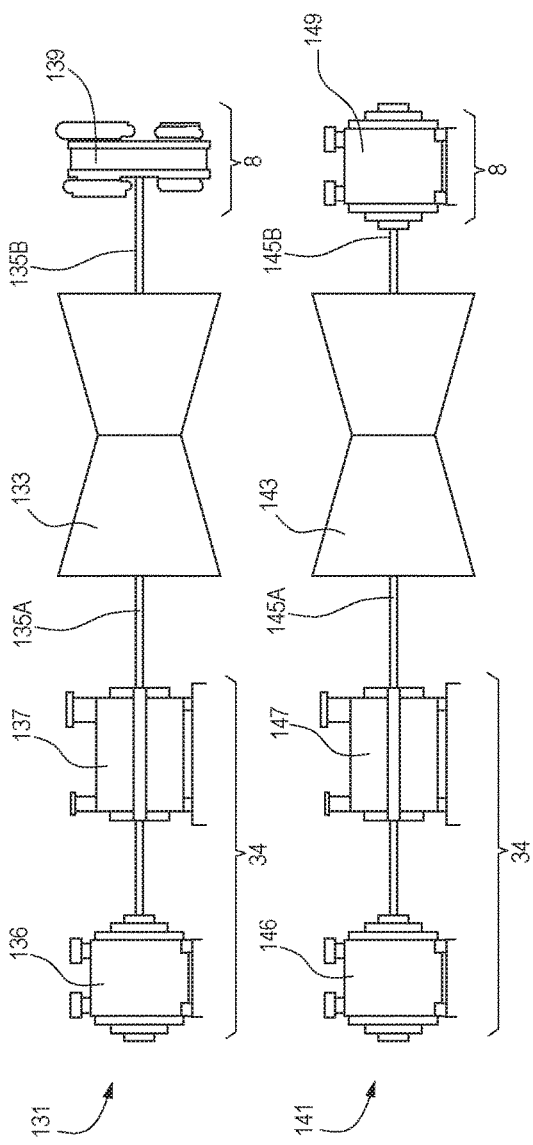

AMMONIA PRODUCTION PLANT

This application claims priority to Italian Patent Application Serial No. 102018000000620, filed on Jan. 8, 2018.

TECHNICAL FIELD

The present disclosure relates to ammonia synthesis plants. Specifically, disclosed herein are novel compression train arrangements for ammonia synthesis plants and systems.

BACKGROUND OF THE INVENTION

Ammonia is a gas with a high solubility in water, which is often used in an aqueous solution. Ammonia ($NH_3$) is used in several industrial applications, among others for the production of nitric acid, urea and other ammonia salts, such as nitrates, phosphates, and the like. Ammonia derivatives are widely used in agriculture. Around 80% of the ammonia production is used for the manufacturing of fertilizers.

Commonly, ammonia is produced by synthesis of nitrogen and hydrogen according to the following exothermic reaction (i.e. a reaction which releases heat):

$$N_2 + 3H_2 \leftrightarrow 2NH_3 + \Delta H$$

wherein $\Delta H$ is heat released by the reaction.

Ammonia production usually starts from a feed gas, which provides a source of hydrogen, such as methane, for instance. Nitrogen is obtained from air. Details of the ammonia production process are known to those expert in the field, and some features of the plant and process will be recalled later on, for a better understanding of the new aspects of the systems disclosed herein and for a better appreciation of the various and beneficial effects thereof vis-à-vis the plants of the current art.

Broadly speaking, the various process steps which are performed to produce ammonia from air and feed gas, require several compression trains. As understood herein, the term "compression train" indicates a machine aggregate comprising at least a driver and one or more compressors driven by the driver, to process one or more gaseous fluids. A gaseous fluid or gas as understood herein is any compressible fluid.

More specifically, in the ammonia production plants of the current art, a first compression train is required to compress the feed gas, such as methane, and deliver compressed feed gas to a primary steam reformer and to a secondary steam reformer. A second compression train is provided to compress process air and deliver compressed process air to the secondary reformer. Raw syngas (synthetic gas) obtained from shift conversion is compressed by a third compression train. A further, fourth compression train is required to process a refrigerant fluid, which chills the ammonia produced from the syngas in an ammonia converter.

FIG. 1 illustrates a schematic of an ammonia production plant 1, with a compression train arrangement according to the current art. In operation, feed gas, for instance methane ($CH_4$), is delivered through a feed gas compression train 3 to a primary catalytic steam reformer 5. The feed gas compression train 3 comprises a first driver 7 and a feed gas compression section 8. This latter can comprise a compressor 9.

Process steam is delivered at 11 to the primary catalytic steam reformer 5, wherein feed gas reacts with steam to generate carbon monoxide and hydrogen according to the reactions $$CH_4 + H_2O \leftrightarrow CO + 3H_2$$

$$CO + H_2O \leftrightarrow CO_2 + H_2$$

The primary reformer 5 is fluidly coupled to a secondary steam reformer 15, which receives the reaction products from the primary reformer 5 in addition to process air from process air inlet line 17. The process air is compressed by a process air compression train 19.

The process air compression train 19 comprises a second driver 21, which can drive a process air compression section 22. This latter can include for instance a first process air compressor 23 and a second process air compressor 25 arranged in series. An intercooler 27 can be arranged between the delivery of the first process air compressor 23 and the second process air compressor 25.

In the secondary steam reformer 15 the unreacted $CH_4$ from the primary catalytic steam reformer 5 is transformed into carbon monoxide (CO) and carbon dioxide ($CO_2$) by combustion. The resulting gas mixture is raw syngas, which is delivered to a shift conversion unit 29.

In the shift conversion unit 29 the carbon monoxide is converted into carbon dioxide according to the following reaction $$CO + H_2O \leftrightarrow CO_2 + H_2$$

The resulting gas mixture is delivered to a scrubber 31, where carbon dioxide is stripped and the resulting gas mixture is delivered to a methanation section 33. The residual carbon monoxide contained in the gas flow from the scrubber 31 is converted by hydrogenation in the methanation section 33, generating $CH_4$ and $H_2O$ according to the reactions $$CO + 3H_2 \leftrightarrow CH_4 + H_2O$$

$$O_2 + 4H_2 \leftrightarrow CH_4 + 2H_2O$$

The gas mixture thus obtained is fed through a drier 35 and the resulting pure syngas, containing mainly nitrogen and hydrogen, is compressed by a syngas compression section 34.

The syngas compression section 34 can comprise one or more compressors driven by a third driver. In the schematic of FIG. 1, the syngas compression section 34 comprises a first compressor 36 and a second compressor 37, driven by a third driver 39. The compressors 36, 37 and the third driver 39 form a syngas compression train 41. Intercoolers 42, 44 can be provided between compression sections and/or between compressors of the syngas compression section 34

The compressed syngas is delivered to an ammonia converter 43 to produce the desired end-product ammonia according to the ammonia synthesis reaction $$3H_2 + N_2 \leftrightarrow 2NH_3$$

Ammonia from the ammonia converter 43 is chilled in a chiller 45. Chilling is achieved by means of a refrigeration cycle, which comprises a refrigerant compression train 48. The refrigerant compression train 48 comprises a refrigerant compression section 46 and a fourth driver 47. The refrigerant compression section 46 can include a first compressor 49 and a second compressor 51 and can comprise an intercooler 53 between them.

The chilled ammonia flows through a liquid/gas separator 55, where the gaseous ammonia is removed and recycled through the syngas compression train, as pictorially represented by a recycling line 57.

The above briefly described ammonia production system is complex and requires four compression trains, each embodying one of the four compression sections, namely: the feed gas compression section 8; the process air compression section 22; the syngas compression section 34; and the refrigerant compression section 46. Each compression section is provided with a respective driver, namely first driver 7, second driver 21, third driver 39 and fourth driver 47, to form four compression trains, namely the feed gas compression train 3, the process air compression train 19, the syngas compression train 41 and the refrigerant compression train 48.

The requirement of several compression trains makes the ammonia production plant complex and expensive. It would therefore be desirable to simplify the general arrangement of an ammonia production plant.

SUMMARY OF THE INVENTION

In one aspect, the subject matter disclosed herein is directed to an ammonia production plant, comprising a plurality of compression sections, or so-called "services". The plant may include: a feed gas compression section; a process air compression section; a syngas compression section; and a refrigerant compression section. According to embodiments disclosed herein, at least two of said compression sections are combined to form a combined compression train driven by a single driver. The complexity of the plant is thus reduced. The number of drivers is reduced and this may lead to a cost reduction of the plant.

According to some embodiments, three compression sections are combined in a single combined compression train, driven by a single driver.

In another aspect, the subject matter disclosed herein is directed to an ammonia production plant, comprising a plurality of gas compression sections, such as: a feed gas compression section; a process air compression section; a syngas compression section; an ammonia refrigerant compression section. In some embodiments, the refrigerant compression section comprises an integrally geared compressor, which provides particular advantages in terms of low cost and high efficiency.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the invention will be readily obtained as the same becomes better understood by reference to the following detailed description when considered in connection with the accompanying drawings, wherein:

FIG. 1, described above, illustrates a schematic of an ammonia production plant of the current art;

FIG. 2 illustrates a first schematic of a combined compression train according to the present disclosure;

FIG. 3 illustrates a second schematic of a combined compression train according to the present disclosure;

FIG. 4 illustrates a third schematic of a combined compression train according to the present disclosure;

FIG. 5 illustrates a fourth schematic of a combined compression train according to the present disclosure;

FIG. 6 illustrates a fifth schematic of a combined compression train according to the present disclosure;

FIG. 7 illustrates a sixth schematic of a combined compression train according to the present disclosure;

FIG. 7A illustrates a detail of a compressor of the compression train of FIG. 7;

FIG. 8 illustrates a seventh schematic of a combined compression train according to the present disclosure;

FIG. 9 illustrates an eighth schematic of a combined compression train according to the present disclosure;

FIG. 10 illustrates a ninth schematic of a combined compression train according to the present disclosure;

FIG. 11 illustrates a tenth schematic of a combined compression train according to the present disclosure;

FIG. 12 illustrates an eleventh schematic of a combined compression train according to the present disclosure;

DETAILED DESCRIPTION

Figure 13:
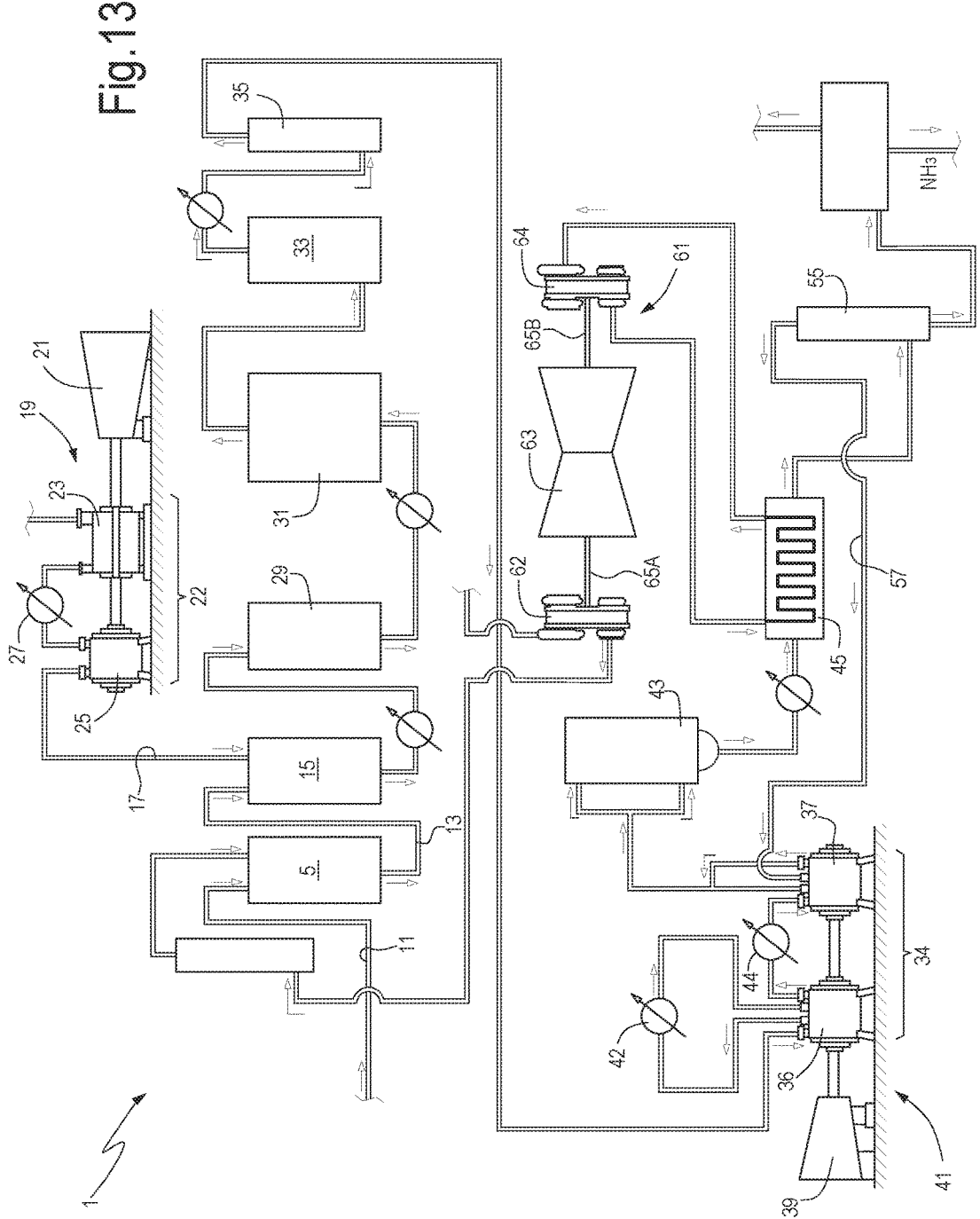
FIG. 13 illustrates a schematic of an ammonia production plant according to the present disclosure, with a combined compression train grouping the refrigerant compression section and the feed gas compression section.

The following detailed description of the exemplary embodiments refers to the accompanying drawings. The same reference numbers in different drawings identify the same or similar elements. Additionally, the drawings are not necessarily drawn to scale. Also, the following detailed description does not limit embodiments of the invention. Instead, the scope of embodiments of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Disclosed herein are arrangements for ammonia production plants, wherein at least two compression sections, usually also called "services", of the plant are combined in a single compression train, such that the total number of compression trains and relevant drivers is reduced and the plant is significantly simplified.

In some embodiments, only two services, i.e. two compression sections, are combined in a single compression train, which is driven by a common single driver. In other embodiments, three compression sections, or services, are combined into a single compression train, such that a single driver will power three services, or compression sections, further reducing the footprint and complexity of the plant as a whole.

In some particularly beneficial arrangements, one or more compression sections may include integrally geared compressors. These compressors are characterized by a central bullgear, drivingly coupled to the driver. The bullgear meshes with a plurality of pinions. Each pinion in turn rotates one or more compressor wheels. The compressor is called integrally geared, since it includes a gearing, which provides for different rotational speeds for the different compressor stages. In configurations disclosed herein, integrally geared compressors can be less expensive and more efficient than standard beam centrifugal compressors.

As understood herein, a driver is any mechanical power generating machine, which is adapted to drive a compressor or compression train into rotation. In some embodiments, a driver may include a gas turbine engine. In other embodiments, a driver may include an electric motor. In embodiments disclosed herein, a driver can include a steam turbine.

Since, usually more than one compression train is needed, typically at least two compression trains, more than one driver is present in the plant. The drivers can be similar in nature, or different. For instance, all drivers can be steam turbines, but this is not mandatory. In some embodiments, drivers of two or more different kinds, e.g. electric motors, steam turbines, gas turbines, can be combined in the same plant.

In some embodiments, the driver can be provided with a through shaft, i.e. with driving shaft portions, or shaft ends, extending axially from both sides of the driver, such that driven machines, i.e. compressors, can be arranged on both sides of the driver, which is thus located in an intermediate position along the shaft line of the compression train.

A new ammonia plant has been invented that is applicable to industry. Its embodiments, described below with reference to FIGS. 2, 3, 4, 5, 6, 7, 7A, 8, 9, 10, 11, 12, 13, 14 and 15, differ from the current art ammonia plant described above with reference to FIG. 1 in that the new inventive ammonia plant provides simplified, novel and useful arrangements of the compression sections.

More specifically, as will become apparent from the following description, two or more compression sections can be combined into a combined compression train, such that one and the same driver can provide driving power to run two or more compression sections. The arrangements disclosed below result therefore in simplified arrangements of the system, with a reduction of the overall footprint and of the total number of machines required.

The various embodiments of the present disclosure will be described in detail as far as the arrangements of the compression sections and relevant drivers are concerned. The overall layout of the remaining sections and components of the ammonia production system can remain as shown in FIG. 1. Only some possible layouts will be described later on with reference to FIGS. 13, 14 and 15.

According to some embodiments, as schematically shown in FIG. 2, the feed gas compression section 8 and the refrigerant compression section 46 are combined to one another in a combined compression train 61 driven by a single driver 63.

The feed gas compression section 8 can comprise one or more compressors. In the embodiment of FIG. 2, the feed gas compression section 8 comprises a single feed gas compressor 62. In some embodiments, the feed gas compressor 62 can be an integrally geared compressor.

The refrigerant compression section 46 can comprise one or more compressors. In the embodiment of FIG. 2, the refrigerant compression section 46 comprises a single refrigerant compressor 64. In some embodiments, the refrigerant compressor 64 can be an integrally geared compressor.

While in some embodiments the feed gas compression section 8 and the refrigerant compression section 46 can be arranged on one side only of the driver 63, in some embodiments, as schematically shown in FIG. 2, the driver 63 is a double-ended driver, which comprises a first shaft end 65A and a second shaft end 65B. The two shaft ends 65A, 65B can be the ends of one and the same shaft extending through the driver 63. In other embodiments, the driver 63 can include two shafts which rotate independently from one another and project on opposite sides of the driver. In some embodiments, the two shafts projecting from the driver can rotate at different rotational speeds, if so required.

For instance, the driver 63 can be a turbine with one or more rotating turbine wheels. In some embodiments, the driver 63 can be a steam turbine. The turbine may comprise two groups of turbine wheels, each group including one or more wheels, which can be mounted on separate shafts rotating at the same or different rotational speeds. Each shaft projects with a respective shaft end from a respective one of the two axially opposite sides of the driver casing, and is drivingly coupled to a respective one of the feed gas compression section 8 and refrigerant compression section 46.

Referring to FIG. 3, according to further embodiments, the feed gas compression section 8 can be combined with the process air compression section 22 to form a combined compression train 71 comprising a single driver 73. The feed gas compression section 8 can comprise one or more compressors. In the embodiment of FIG. 3, the feed gas compression section 8 comprises a single feed gas compressor 72, for instance an integrally geared compressor. The process air compression section 22 can comprise one or more compressors. In the embodiment of FIG. 3, the process air compression section 22 comprises a single process air compressor 74, for instance an integrally geared compressor.

While in some embodiments the feed gas compression section 8 and the process air compression section 22 can be arranged on one side only of the driver 73, in some embodiments, as schematically shown in FIG. 2, the driver 73 is a double-ended driver, mechanically coupled with first and second shaft ends 75A, 75B to the feed gas compression section 8 and to the process air compression section 22, respectively. The driver 73 can be configured as the driver 63 described above in connection with FIG. 2.

According to further embodiments, as shown in FIG. 4, a combined compression train 81 can comprise the refrigerant compression section 46 and the process air compression section 22, drivingly coupled to a single driver 83.

Similarly to what has been described in connection with FIGS. 2 and 3, the refrigerant compression section 46 of FIG. 4 can comprise one or more compressors. In the embodiment of FIG. 4, the refrigerant compression section 46 comprises a single refrigerant compressor 82. In some embodiments, the refrigerant compressor 82 can be an integrally geared compressor. In other embodiments, the refrigerant compression section 46 can comprise two compressors in series, and possibly an intercooler arranged between them.

The process air compression section 22 can comprise one or more compressors. In the embodiment of FIG. 4, the process air compression section 22 comprises a single process air compressor 84. In some embodiments, the process air compressor 84 can be an integrally geared compressor.

While in some embodiments the process air compression section 22 and the refrigerant compression section 46 can be arranged on one side only of the driver 83, in some embodiments, as schematically shown in FIG. 4, and similarly to FIGS. 2 and 3, the driver 83 is a double-ended driver, which comprises a first shaft end 85A and a second shaft end 85B. The two shaft ends 85A, 85B are drivingly coupled to the refrigerant compression section 46 and to the process air compression section 22, respectively.

In further embodiments, more than two compression sections can be arranged in one combined compression train driven by a single driver.

In FIG. 5 an embodiment is shown, comprising a combined compression train 91, which includes a single driver 93 having two shaft ends 95A, 95B. The combined compression train 91 is formed by the compressors of the refrigerant compression section 46, the feed gas compressions section 8 and the process air compression section 22. In the embodiment of FIG. 5, the refrigerant compression section 46 comprises a single compressor 96, for instance an integrally geared compressor. The feed gas compression section 8 comprises a single compressor 97, for instance an in-between-bearings centrifugal compressor with a drive through, such as a vertically split centrifugal compressor or a horizontally split centrifugal compressor.

As used herein the term "drive through compressor" can be understood as a compressor comprising a shaft which extends through the compressor casing and has first shaft end and second shaft end projecting from opposite sides of the casing, such that the compressor rotor can be drivingly coupled to machines arranged on both sides of the compressor and mechanical power can flow through the compressor. The term "in-between-bearings compressor" as used herein may be understood as a compressor having a shaft supported by two bearing arrangements at two ends thereof, and supporting a plurality of compressor impellers positioned between the two bearing arrangements.

The drive shaft of compressor 97 extends through the compressor casing, such as to transmit mechanical power from one of the two shaft ends 95A, 95B of the driver 93 to the compressor 96.

The process air compression section 22 can comprise a single compressor 98, for instance an integrally geared compressor.

While in the embodiment of FIG. 5 the refrigerant compression section 46 and the feed gas compression section 8 are arranged on one side of the driver 93, and the process air compression section 22 is on the other side of the driver 93, other arrangements are possible. For instance, the feed gas compression section 8 and the process air compression section 22 can be arranged on the same side of the driver 93, while the refrigerant compression section 46 is arranged on the opposite side thereof.

FIG. 6 illustrates a further combined compression train 101, wherein the same compression sections as in FIG. 5 are provided and drivingly coupled to a single driver 103 with shaft ends 105A, 105B, The sequence of compression sections is, however, different. In the embodiment of FIG. 6, with continuing reference to FIG. 5, the refrigerant compression section 46 can comprise a single compressor 106 arranged between the driver 103 and a teed gas compression section 8, which can in turn comprise a single feed gas compressor 107. The refrigerant compressor 106 can be an in-between-bearings compressor, for instance a vertically split or a horizontally split centrifugal compressor, with a drive shaft extending therethrough, to transmit power from the driver 103 to the feed gas compressor 107. This latter can be an integrally geared compressor, for instance. The process air compression section 22 is arranged on the opposite side of the driver 103 and can include a single compressor, for instance an integrally geared compressor 108.

The driver 93 or 103 can be configured as described above in connection with FIGS. 2 and 3.

In the embodiments shown in FIGS. 2, 3, 4, 5 and 6, those compression sections of plant 1, which are not arranged in a combined compression train, can be designed according to the current art. In other embodiments, however they can be in turn combined in a second combined compression train, such that only two compression trains and two drivers are provided in the same plant 1. For instance, if the refrigerant compression section 46 and the feed gas compression section 8 are combined in a single combined compression train 61, the syngas compression section 34 and the process air compression section 22 can be combined in another combined compression train.

Exemplary embodiments of compression trains including the syngas compression section 34 are disclosed below.

FIG. 7 illustrates an embodiment of a combined compression train 111, which includes the syngas compression section and the refrigerant compression section. The embodiment of FIG. 7 can be combined with other embodiments disclosed herein.

The compression train 111 of FIG. 7 is comprised of a single driver 113 with shaft ends 115A, 115B. The combined compression train 111 contains the syngas compression section 34 and the refrigerant compression section 46. In some embodiments, as shown in FIG. 7, compression sections 34, 46 are arranged on opposite sides of the single driver 113. In other embodiments, the compression sections 34, 46 can be arranged on the same side of the driver 113.

In some embodiments, the syngas compression section 34 can comprise two syngas compressors 116 and 117. For instance, the compressor 116 can be a high pressure ratio compressor. As used herein, the term "high pressure ratio compressor" can be understood as a centrifugal compressor having a compression ratio above 40, more particularly, around 50 or higher.

In some embodiments, one of the syngas compressors 116, 117, for instance the high pressure ratio compressor 116, may include a recycle impeller. The recycle impeller can be mounted in an overhanging manner, on a projecting end of a shaft, which is supported by end bearings, the compressor stages being placed in-between bearings. FIG. 7A schematically shows a centrifugal compressor 116 having a central shaft 116.5 supported in a casing 116.1 by means of bearings 116.3. Compressor impellers 116.2 are arranged on the shaft 116.5 in an in-between-bearings configuration. An end of the shaft 116.5 supports an overhanging recycle impeller 116.4.

The second compressor 117 can be a vertically split or a horizontally split centrifugal compressor with a through shaft, connecting the driver 113 to the compressor 116.

The refrigerant compression section 46 can comprise a single compressor 119. In the embodiment of FIG. 7 the compressor 119 is an integrally geared compressor.

FIG. 8 illustrates a further embodiment of a combined compression train 121 comprising the syngas compression section 34 and the process air compression section 22. The compression train 121 of FIG. 8 is comprised of a single driver 123 with shaft ends 125A, 125B connecting the driver 123 to the syngas compression section 34 and the process air compression section 22, respectively. In some embodiments, not shown, compression sections 34, 22 can be arranged on the same side of the driver 123. Similarly to FIG. 7, in some embodiments of compression train 121, the syngas compression section 34 can comprise two syngas compressors 126 and 127. For instance, the compressor 126 can be a high pressure ratio compressor. In some embodiments, the high pressure ratio compressor may include a recycle impeller. The second compressor 127 can be a vertically split or a horizontally split centrifugal compressor with a through shaft, connecting the driver 123 to the compressor 126.

The process air compression section 22 can comprise a single compressor 129. In the embodiment of FIG. 8 compressor 129 is an integrally geared compressor.

FIG. 9 illustrates an embodiment of a combined compression train 111, which includes the syngas compression section and the refrigerant compression section. The embodiment of FIG. 9 can be combined with other embodiments disclosed herein.

The compression train 111 of FIG. 9 is comprised of a single driver 113 with shaft ends 115A, 115B. The combined compression train 111 contains the syngas compression section 34 and the refrigerant compression section 46. In some embodiments, as shown in FIG. 9, compression sections 34, 46 are arranged on opposite sides of the single driver 113. In other embodiments, the compression sections 34, 46 can be arranged on the same side of the driver 113.

In some embodiments, the syngas compression section 34 can comprise two syngas compressors 116 and 117. For instance, the compressor 116 can be a high pressure ratio compressor. In some embodiments, the high pressure ratio compressor may include a recycle impeller. The second compressor 117 can be a vertically split or a horizontally split centrifugal compressor, with a through shaft, connecting the driver 113 to the compressor 116.

In the embodiment of FIG. 9 the refrigerant compression section 46 can comprise a high pressure ratio compressor.

FIG. 10 illustrates a further embodiment of a combined compression train 121 comprising the syngas compression section 34 and the process air compression section 22.

The compression train 121 of FIG. 10 is comprised of a single driver 123 with shaft ends 125A, 125B connecting the driver 123 to the syngas compression section 34 and the process air compression section 22, respectively. In some embodiments, not shown, compression sections 34, 22 can be arranged on the same side of the driver 123.

Similarly to FIG. 9, in some embodiments of compression train 121, the syngas compression section 34 can comprise two syngas compressors 116 and 117. For instance, the compressor 116 can be a high pressure ratio compressor. In some embodiments, the high pressure ratio compressor may include a recycle impeller. The second compressor 127 can be a vertically split or a horizontally split centrifugal compressor with a through shaft, connecting the driver 113 to the compressor 116.

FIG. 10 illustrates an embodiment substantially similar to the embodiment of FIG. 8. In FIG. 10 the process air compression section 22 comprises a high pressure ratio compressor 129.

FIG. 11 illustrates a further embodiment of a combined compression train including the syngas compression section 34. The compression train of FIG. 11 is labeled 131 as a whole and can comprise a single driver 133, which can have two shaft ends 135A, 135B, such that the two compression sections combined within compression train 131 can be arranged on opposite sides of the driver 133. In other embodiments, not shown, the compressors of the compression train 131 can be arranged all on the same side of the driver 131.

The shaft end 135A drives the syngas compressions section 34, which can include one or two compressors. In the embodiment shown in FIG. 11, the syngas compression section 34 comprises a first compressor 136 and a second compressor 137. The first compressor 136 can be a high pressure ratio compressor with a recycle impeller, for instance, and the second compressor 137 can be an in-between-bearings compressor with a drive through shaft, for instance a vertically split or a horizontally split centrifugal compressor. The two compressors 136 and 137 can be arranged in series, with the second compressor 137 being arranged upstream of the first compressor 136. A similar series arrangement can be provided for the compressors 126, 127 of FIGS. 8 and 10 and for the compressors 116 and 117 of FIG. 9.

The feed gas compression section 8 can include a single compressor, for instance an integrally geared compressor 139.

In other embodiments, the feed gas compression section 8 can include an in-between-bearings compressor, as shown in FIG. 12, wherein a further combined compression train 141 is shown. The compression train 141 comprises the syngas compression section 34, comprised of first compressor 146 and second compressor 147 arranged in sequence with the second compressor 147 arranged upstream of the first compressor 146. The compression train 141 further comprises a feed gas compression section 8, including an in-between-bearing compressor, for instance a vertically split or a horizontally split centrifugal compressor. The compression sections 34 and 8 are arranged on opposite sides of the driver 143 and are drivingly coupled to a first shaft end 145A and a second shaft end 145B, respectively. In other embodiments, not shown, the compressors can be arranged all on the same side of the common driver 143.

Figure 14:
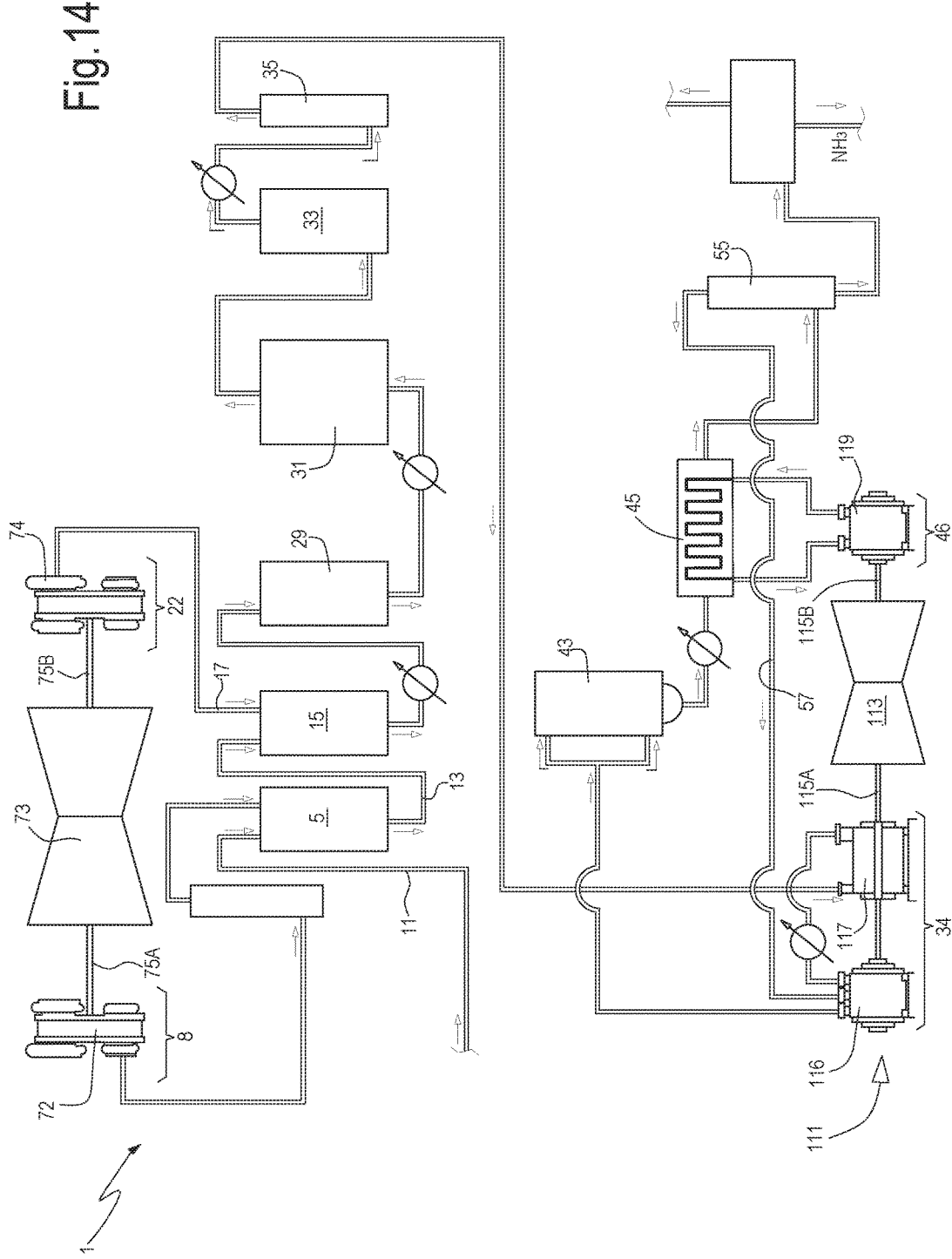
FIG. 14 illustrates a further schematic of an ammonia production plant according to the present disclosure, with a combined compression train grouping the syngas compression section and the refrigerant compression section.
Figure 15:
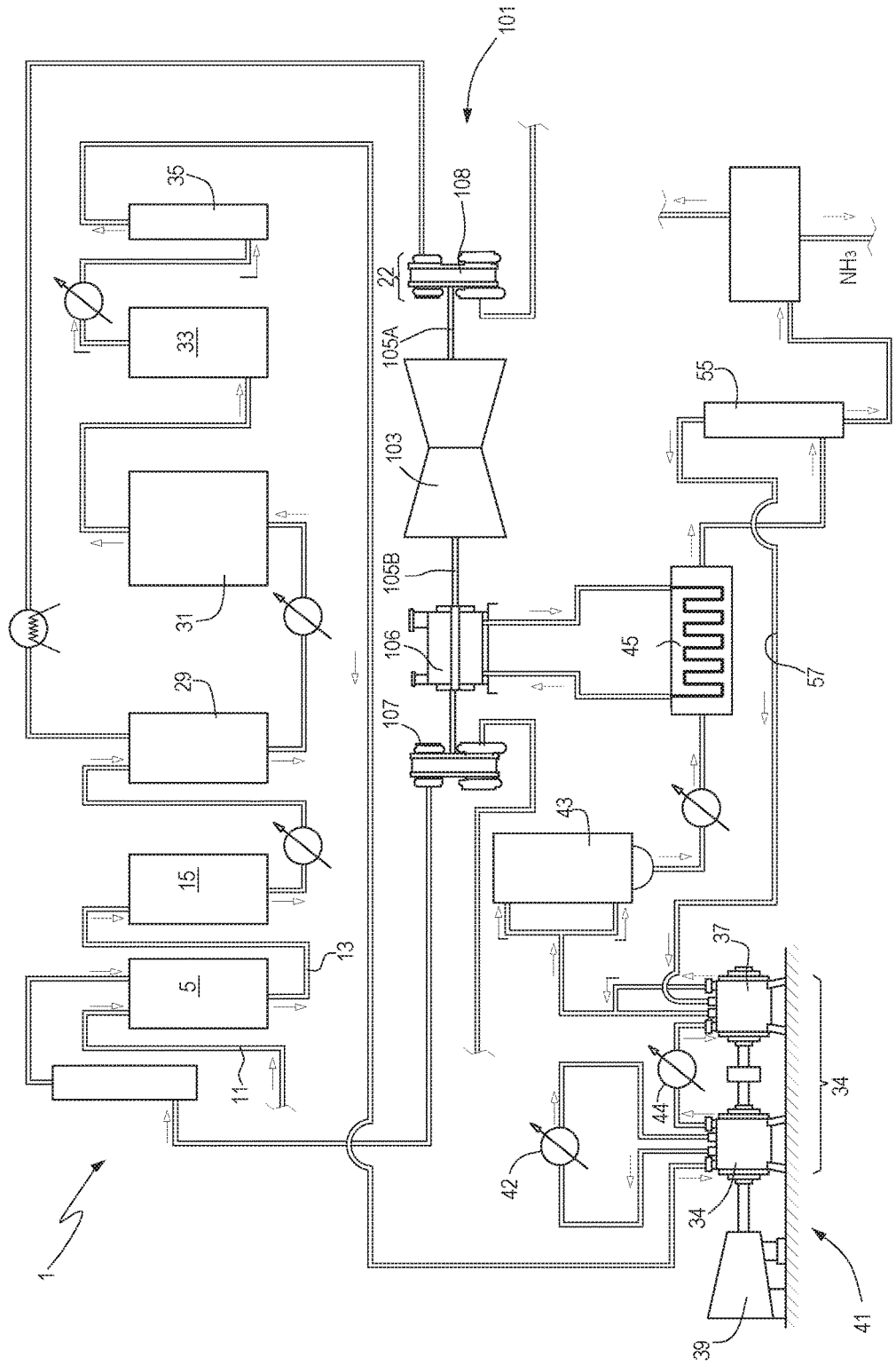
FIG. 15 illustrates yet a further schematic of an ammonia production plant according to the present disclosure, with a combined compression train grouping the feed gas compression section, the refrigerant compression section and the process air compression section.

While FIGS. 2, 3, 4, 5, 6, 7, 7A, 8, 9, 10, 11 and 12 illustrate exemplary compression trains in isolation, FIGS. 13, 14 and 15 illustrate by way of example ammonia production plants 1 using combined compression trains of the present disclosure.

More specifically, FIG. 13 illustrates the main components of the ammonia production plant 1 of FIG. 1, wherein the feed gas compression section and the refrigerant compression section are gathered together in a combined compression train 61, shown in FIG. 2. The same reference numbers used in FIGS. 1 and 2 designate the same or corresponding components or elements in FIG. 13. The process air compression train 19 and the syngas compression train 41 are configured as in FIG. 1.

FIG. 14 illustrates the main components of the ammonia production plant 1 of FIG. 1, wherein the syngas compression section and the refrigerant compression section have been gathered together in a single compression train 111 having the structure described above in connection with FIG. 7 or 9. The feed gas compression section and the process air compression section are gathered together in a single compression train 71 as shown in FIG. 3 and described above.

FIG. 15 illustrates again a schematic of the ammonia production plant 1, wherein the feed gas compression section, the refrigerant compression section and the process air compression section are gathered in a single combined compression train 101 having the layout shown in FIG. 6.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An ammonia production plant, comprising:
   a feed gas compression section;
   a process air compression section;
   a syngas compression section; and
   a refrigerant compression section;
   wherein at least two of the compression sections are combined to form a combined compression train driven by a single driver.

2. The ammonia plant production of claim 1, wherein the single driver is a steam turbine.

3. The ammonia production plant of claim 1, wherein the single driver is a double-end driver comprising a first shaft end and a second shaft end on opposite sides of a driver casing, a first one of the at least two compression sections being drivingly coupled to the first shaft end and a second one of the at least two compression sections being drivingly coupled to the second shaft end.

4. The ammonia production plant of claim 1, wherein the combined compression train comprises the syngas compression section, and wherein the syngas compression section comprises two compressors arranged in series.

5. The ammonia production plant of claim 4, wherein the syngas compression section comprises a recycle impeller in an overhanging arrangement and an in-between-bearings, drive through compressor.

6. The ammonia production plant of claim 1, wherein the combined compression train comprises three of the feed gas compression section, process air compression section, syngas compression section, refrigerant compression section, driven into rotation by the single driver.

7. The ammonia production plant of claim 6, wherein the combined compression train comprises in combination: the refrigerant compression section, the feed gas compression section and the process air compression section.

8. The ammonia production plant of claim 6, wherein: a first of the compression sections of the combined compression train is drivingly coupled to a first shaft end of the single driver; a second of the compression sections of the combined compression train is drivingly coupled to a second shaft end of the single driver; a third of the compression sections of the combined compression train is drivingly coupled to the first compression section, the first compression section comprising a drive-through compressor.

9. The ammonia production plant of claim 1, wherein at least one of the compression sections of the combined compression train comprises an integrally geared compressor.

10. The ammonia production plant of claim 9, wherein at least one of the following compression sections included in the combined compression train comprises said integrally geared compressor:
    the refrigerant compression section;
    the feed gas compression section; and
    the process air compression section.

11. The ammonia production plant of claim 9, wherein at least two of the compression sections of the combined compression train comprise a respective integrally geared compressor.

12. The ammonia production plant of claim 11, wherein the integrally geared compressors of the at least two compression sections are arranged at opposite sides of the single driver and are drivingly coupled to opposite first shaft end and second shaft end of the single driver.

13. The ammonia production plant of claim 11, wherein the combined compression train comprises at least the feed gas compression section and the refrigerant compression section, and wherein both the feed gas compression section and the refrigerant compression section comprise a respective integrally geared compressor.

14. The ammonia production plant of claim 11, wherein the combined compression train comprises at least the feed gas compression section and the process air compression section, and wherein both the feed gas compression section and the process air compression section comprise a respective integrally geared compressor.

15. The ammonia production plant of claim 11, wherein the combined compression train comprises at least the refrigerant compression section and the process air compression section, and wherein both the refrigerant compression section and the process air compression section comprise a respective integrally geared compressor.

16. An ammonia production plant, comprising:
    a feed gas compression section;
    a process air compression section;
    a syngas compression section; and
    a refrigerant compression section;
    wherein the refrigerant compression section comprises an integrally geared compressor.

* * * * *